United States Patent [19]

James et al.

[11] Patent Number: 5,252,441
[45] Date of Patent: Oct. 12, 1993

[54] TRANSPARENT MAGNETIC RECORDING LAYERS AND PHOTOGRAPHIC ELEMENTS CONTAINING THE SAME

[75] Inventors: Robert O. James; Sidney J. Bertucci; George L. Oltean, all of Rochester, N.Y.

[73] Assignee: Eastman Kodak Company, Rochester, N.Y.

[21] Appl. No.: 609,672

[22] Filed: Nov. 6, 1990

[51] Int. Cl.$^5$ .............................................. G03C 1/00
[52] U.S. Cl. .................................. 430/496; 430/140; 430/395; 427/131; 427/407.1; 360/134; 428/694 TF; 428/694 TP
[58] Field of Search ............... 430/140, 395, 496; 427/131, 407.1; 360/134; 428/694

[56] References Cited

U.S. PATENT DOCUMENTS

| | | | |
|---|---|---|---|
| 2,885,366 | 5/1959 | Iler | 252/62.55 |
| 3,782,947 | 1/1974 | Krall | 430/21 |
| 4,279,945 | 7/1981 | Audran et al. | 430/140 |
| 4,302,523 | 11/1981 | Audran et al. | 430/140 |
| 4,624,883 | 11/1986 | Yamaguchi et al. | 360/134 |
| 4,851,288 | 7/1989 | Ishikuro et al. | 428/694 |
| 4,874,668 | 10/1989 | Asada et al. | 428/694 |
| 5,043,212 | 8/1991 | Ando et al. | 428/694 |
| 5,082,733 | 1/1992 | Watanabe et al. | 428/694 |

FOREIGN PATENT DOCUMENTS

686172  5/1964  Canada .

Primary Examiner—Charles L. Bowers, Jr.
Assistant Examiner—Thomas R. Neville
Attorney, Agent, or Firm—Robert A. Gerlach

[57] ABSTRACT

A photographic element including a light-sensitive layer and a transparent magnetic layer wherein the magnetic particles in the transparent binder are cobalt surface treated gamma iron oxide ($Fe_2O_3$) having a specific area of at least 30 m$^2$/g, the particles being coated with from about 10 to about 50% by weight of a material having a refractive index less than that of the binder, the particles having a powder coercivity greater than about 450 Oe.

25 Claims, 5 Drawing Sheets

TRANSPARENT MAGNETIC RECORDING LAYERS AND PHOTOGRAPHIC ELEMENTS CONTAINING THE SAME

BACKGROUND OF THE INVENTION

1. Field of the Invention

This invention relates to transparent magnetic recording layers, to photographic elements, and more particularly, photographic elements containing a transparent magnetic recording layer.

2. Description of Related Art

Conventional magnetic recording elements that are used for recording sounds or images are generally opaque to visible light regardless of the nature of the magnetic particles used in such elements. For example, motion picture films often are provided with a magnetic sound track which generally is opaque and does not cover that portion of the film used in the projection of images.

Canadian Patent 686,172 shows that a magnetic recording layer may be transparent to visible light when it contains low concentrations of magnetizable particles. According to this patent, such a layer is coated over a layer containing descriptive material which allows a user to simultaneously hear and see certain subject matter. However, this patent points out that the electromagnetic characteristics, i.e., the magnetic recording and reproducing characteristics, of such a layer are inferior to those of conventional magnetic layers as a result of the very low concentrations of magnetizable particles.

U.S. Pat. No. 3,782,947 discloses a photographic product which carries magnetic particles distributed across the image area of the product. The particle distribution and sizes are so designed that the composite granularities of the photographic and magnetic distribution is essentially transparent in a photographic sense. According to this patent, the photographic image can be viewed via the magnetic distribution and the magnetic distribution can be employed for recording and playback information.

U.S. Pat. Nos. 4,279,945 and 4,302,523 disclose a process of preparing magnetic recording elements containing a transparent recording layer. According to these patents, the magnetic recording and reproducing characteristics obtained are comparable to conventional opaque magnetic layers without the need for matching the granularity of a magnetic medium to that of a photographic medium. However, the process requires that the layer containing magnetic particles be treated using one or both of the following process steps, (1) compacting the layer while it is in a malleable state to reduce its thickness (e.g., calendaring), or (2) imbibing into the layer a substantially transparent liquid having a refractive index that is substantially the same as that of the binder.

Elements of the type described in the above-cited patents have not achieved widespread commercial success for various reasons. For example, the elements described in U.S. Pat. No. 4,279,945, as indicated by the Figure therein, are substantially opaque at wavelengths less than about 500 nm and thus are not useful in color films. Further, the disclosed process requires that the magnetic recording layer be calendered while it is in a malleable state and/or that a transparent liquid be imbibed into the magnetic recording layer.

It is evident that it would be highly desirable to provide photographic elements having a transparent magnetic recording layer exhibiting improved magnetic and photographic performance. This goal is difficult to achieve because of the nature of the magnetic particles and the concentration of particles required to provide a sufficient signal to write and read magnetically stored data. There may also be noticeable color and haze associated with the magnetic layer depending upon the type of pigment, the concentration of the pigment and the effective particle size thereof.

The critical photographic properties affected by the magnetic layer are the optical density and the granularity. To reduce the impact of the magnetic layer on photographic quality, both the optical density and the granularity must be minimized so these properties have no adverse effects on the color, the brightness of highlighted areas and the granularity of prints made from negatives or projected images from transparencies. This is what is meant when layers are spoken of herein as being "transparent in a photographic sense".

In co-pending application Ser. No. 473,494, filed Feb. 1, 1990, now abandoned, by Robert O. James and John Rieth, and entitled "Photographic Element Containing Thin Transparent Magnetic Recording Layer and Method For the Preparation Thereof" is disclosed and claimed photographic elements containing a transparent magnetic recording layer wherein the magnetic particles included in the recording layer are cobalt surface treated gamma iron oxide particles having a specific surface area of at least 30 $m^2/g$, the concentration of the magnetic particles being from about 10 to about 1000 milligrams/$m^2$.

SUMMARY OF THE INVENTION

This invention provides a transparent magnetic layer or film comprising magnetic particles in a transparent binder wherein the magnetic particles are cobalt treated gamma iron oxide having a specific surface area of at least 30 $m^2/g$ and exhibit powder coercivities greater than 450 Oe, the magnetic particles being coated with from about 10 to about 50% by weight of a material having a refractive index less than the refractive index of the binder material.

The invention also contemplates photographic products having a support, a light-sensitive layer and a transparent magnetic layer in accordance with the above.

DESCRIPTION OF THE PREFERRED EMBODIMENTS

As indicated previously the invention relates to transparent layers containing the magnetic particles the layers being capable of having coded information written and read therefrom. The transparent layers containing the magnetic particles in accordance with this invention are particularly applicable for use in combination with photographic films wherein information can be written into the magnetic layer without affecting the quality and performance of the light-sensitive photographic elements. In order to achieve this result it is necessary that a sufficient quantity of a particular type of magnetic particle as described and claimed in copending application Ser. No. 609,673 filed Nov. 6, 1990, now U.S. Pat. No. 5,217,804, entitled "Magnetic Particles", filed on even date herewith, and incorporated herein by reference, be incorporated into a transparent binder. The magnetic particles employed in the transparent layers exhibit a decreased light extinction cross-section in comparison with uncoated particles.

Figure 1A:
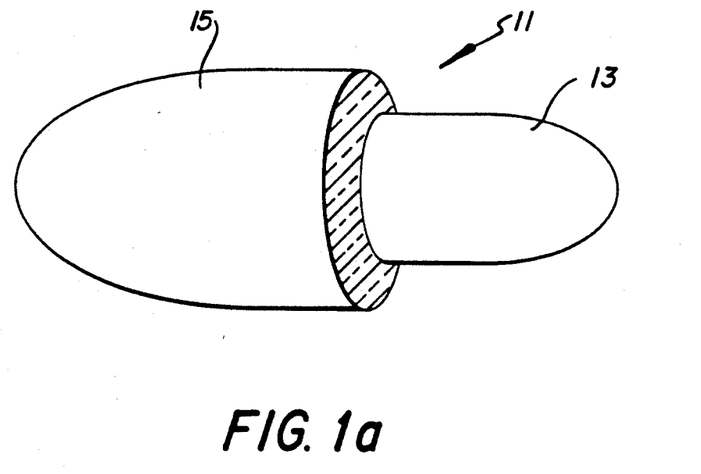
FIG. 1a is a diagrammatic representation of a magnetic core particle having a uniform coating thereon with a portion cut away for purposes of understanding.
Figure 1B:
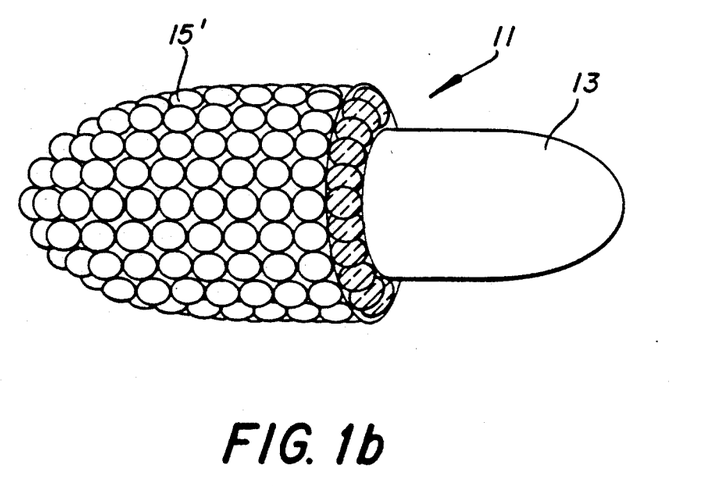
FIG. 1b is a similar view of a magnetic core particle where the coating is particulate in nature.

Referring specifically to FIGS. 1a and 1b, 1a illustrates a magnetic particle 11 having a core 13 coated with a uniform shell 15. The shell 15 is cut away in order to better illustrate the nature of the particles. The shell of FIG. 1a is uniform in nature and forms a continuous coating on core 13. FIG. 1b is similar to that of FIG. 1a having a core 13 in a shell 15'. However in this case the shell is not a uniform layer as shown in FIG. 1a but a particulate layer. The necessary characteristics of the magnetic particles in accordance with this invention are (1) the magnetic core must have a specific area of at least 30 $m^2/g$ (2) the core is a cobalt surface treated gamma iron oxide ($Co$-$\gamma$-$Fe_2O_3$) having a powder coercivity of at least 450 Oe and preferably from about 650 to about 850 Oe (3) the shell material must have a refractive index that is lower than the refractive index of the core and of the medium or binder in which the particles are suspended and (4) the shell material must comprise at least 10% by weight of the entire particle, preferably from about 15% by weight to about 50% by weight. Regarding (3) above, the refractive indices of the shell and the binder are less than the refractive index of the magnetic core particle, however, as a practical matter this is generally the case as the refractive index of the core is generally about 2.5 to 3.

These requirements with regard to the particulate magnetic material, when combined with the requirement of the layer of magnetic material in a binder in the proper concentration insures that the magnetic layer is substantially transparent in photographic sense, while at the same time the presence of the magnetic material is sufficient to provide a signal to write and read magnetically stored data.

The critical photographic properties affected by the magnetic layer as indicated are the optical density and the granularity. To reduce the impact of the magnetic layer on a photographic layer of a light-sensitive element, when the magnetic layer extends over the face of the light-sensitive element, both the optical density and the granularity must be minimized so that these properties have no affect on the color, the brightness of highlight areas and the granularity of prints made from negatives or projected images from transparencies.

Cobalt surface treated gamma iron oxide particles having the necessary specific surface areas of at least 30 $m^2/g$ and exhibiting the powder coercivities indicated above are commercially available and can be obtained from Toda Kogyo Corporation under the trade designations CSF 4085V2, CSF 4585V and CND 865V. Further, pigments supplied by Pfizer Pigment Inc. under the trade designations RPX-4392, RPX-5003, RPX-5026 and RPX-5012 are suitable as starting materials for the preparation of the coated particulate magnetic materials in accordance with this invention.

Regarding the value of the refractive index of the shell material expressed as less than the refractive index of the binder materials in which the particles are dispersed, as a practical matter, most binder materials have a refractive index greater than 1.5. Therefore, to achieve the transparency in a photographic sense, a refractive index of the shell material less than 1.5 is generally satisfactory. For example, the refractive indices of cellulose acetate varies from 1.46 to 1.5 and gelatin is about 1.5. Any shell material having a refractive index less than the refractive index of the binder is suitable. However, it will be appreciated that the greater the difference between the refractive index of the shell and the binder, the greater is the possible reduction in the light extinction efficiency. Any suitable material capable of being coated on the particulate material having a refractive index less than that of the binder material employed in the preparation of a magnetic layer may be used as the coating on the particulate cobalt treated gamma iron oxides such as for example, magnesium fluoride, calcium fluoride, halogenated hydrocarbon such as polytetrafluoroethylene, polyhexafluoropropane, polyvinylidene fluoride and the like, silica, composite materials of silica and alumina, and the like. Voids may be included within the shell material to effectively lower the refractive index of the shell. In this manner, materials normally not suited for the shell because the refractive index is higher than that of the binder may be employed, so long as the refractive index is lowered due to the presence of the voids, to less than that of the binder. Suitable materials for the shell together with their refractive indices are set forth in Lange's *Handbook of Chemistry*, Eighth Edition, Published by Handbook Publishers, Inc., 1952, at pages 1259-1306. As illustrated with respect to FIGS. 1a and 1b, the coating on the particulate magnetic particle may be a uniform coating or may itself be a particulate and may contain voids as expressed above.

The coated cobalt treated gamma iron oxide particles of this invention may be prepared by any suitable technique whereby thick coatings as required by this invention can be applied to a core material such as the precipitation of soluble silicates to form skins of dense hydrated amorphous silica as disclosed in U.S. Pat. No. 2,885,366. While "thick" as used above is a relative term, the thickness dimension of the shell generally varies from about 10 nm to about 200 nm. The optimum thickness of the shell depends on the volume of the core particle. In order to coat the magnetic particles having the requisite specific surface area and coercivity in accordance with this invention, it is generally first necessary to wet the magnetic particles as received from the manufacturer in order to deaggregate and disperse the particles. This is generally achieved by employing various wetting agents or dispersants in aqueous dispersions containing the dispersed particles. Milling is conducted in order to deaggregate the particles. A dense silica skin can be precipitated onto the particles by the addition of sodium silicate and sulfuric acid.

Other silica coatings can be formed on the magnetic core by dispersing the magnetic particles in aqueous solutions using an alkaline wetting agent. This results in a negative charge on the particle surface which is reversed to a positive charge by a heterocoagulation or adhesion of particles of an alumina sol. This positively charged magnetic composite can then be coated with a negatively charged particulate colloidal silica to yield a composite magnetic oxide/alumina/silica particle having a shell containing about 30% by weight. The weight percentage of the shell material can then even be further increased by coating with a dense form of silica as illustrated in a subsequent example to provide a particle having a shell wherein the shell is approximately 42% by weight.

Other methods of preparing a core shell structure may also be employed. For example, silica shells can be grown on magnetic iron oxide cores by a modified sol gel process. In this process silicon tetraalkoxide dissolved in anhydrous alcohol is added to an alcoholic dispersion of the cobalt gamma iron oxide particle and then hydrolyzed by the addition of an ammonia solution to yield the particles having a silica shell surrounding the magnetic cobalt gamma oxide core.

Fluorocarbon coated cobalt treated gamma iron oxide particles can be made by a procedure analogous to that described in an article entitled "Interactions in Mixed Fluorocarbon Latex-Hematite Dispersions" by M. Visca, S. Savonelli, E. Barouch and E. Matijevic published in the *Journal of Colloid and Interface Science*, Vol. 122, No. 2, April 1988.

The transparent magnetically recordable layers or films and photographic elements in accordance with this invention include a support, a light-sensitive layer and a transparent magnetic recording layer. Transparent magnetic recording layers or films would have widespread application in many environments wherein it would be desirable to include or encode information without interfering with the visual appearance of the object onto which the magnetic recording is made. For example, in a sheet of written text or a picture, information could be recorded into the magnetic recording transparent layer without interfering with the visual appearance of the text or the picture underlying the transparent magnetic recording layer. Such transparent recording layers can be prepared simply by incorporating the above described coated magnetic particles in the correct concentration in a film forming binder or by applying such a film forming binder to a substrate. For example, if it were desired to provide magnetically encoded information to this page of text, a layer of the above-described magnetic particles in a binder could be either coated onto the page of text or a self-standing film containing the appropriate concentration of magnetic particles could first be prepared and then laminated to the printed page. This would then enable one not only to read the visual text in the normal manner but also to read out the information contained in the encoded magnetic transparent layer.

The primary utility for transparent magnetic recording layers is in the photographic industry wherein a photographic film can be built onto a substrate that includes a transparent recording layer. The transparent magnetic recording layer may be disposed in any position relative to the various layers of the photographic film including over the light sensitive layers, within the layers, within the base, substrate, however, it is preferred that the transparent magnetic layer be applied on a layer on the side opposite the light-sensitive layers of the photographic film. This provides ease of encoding and readout. One suitable technique would be to prepare the substrate for the film whether it be cellulose acetate, polyethylene terephthalate, polycarbonate paper or other suitable substrate for that purpose with a transparent magnetic recording layer on one surface thereof. This again can be achieved either by coating applications widely known in both the photographic and magnetic recording fields of technology or forming a self-sustaining film of the above-described magnetic particles in a transparent binder and laminating this to the photographic substrate. Information can then be encoded into the magnetic layer during all steps of the preparation of the photographic product. This can include manufacturing data with regard to the various layers that are employed during the preparation of the film, information with regard to the properties of the various layers built onto the substrate and the like. Further, after the film is completed and is being used by the consumer, many and various applications can be envisioned wherein information is included in the magnetic layer that is helpful to the photographer, the developing laboratory and others engaged in this field of endeavor. For example, where a camera also has the capability of imparting data to a magnetic layer by having built in recording heads into the camera, information with regard to each frame of the film can be recorded, such as, the light conditions, the speed at which the frame is exposed, the F-Stop number and the like.

The support film and transparent magnetic recording layer preferably are provided in the form of a composite unitary structure consisting of at least the flexible support film and the substantially transparent magnetic recording layer prepared in a process as described in co-pending application Ser. No. 473,494, filed Feb. 1, 1990, to R. O. James and J. Rieth, which is incorporated herein in its entirety. Preferably to have nearly isotropic magnetic and optical properties of the film, care should be taken to randomly arrange the anisometric particles in the binder. It may be desirable to perpendicularly orient the magnetic particles. This may be accomplished utilizing the teaching of U.S. Pat. No. 4,859,495 issued Aug. 22, 1989 to James P. Peng (incorporated herein by reference).

In forming the transparent magnetic recording layer in accordance with the invention, the above-described magnetic particles are homogeneously dispersed in a substantially transparent binder and a solvent for the binder. Any suitable transparent binder may be employed including cellulose organic acid esters, such as, for example, cellulose diacetate, cellulose triacetate, cellulose acetate butyrate, cellulose nitrate, cellulose acetate propionate and the like; polyurethanes, polyesters, polycarbonates and the like. Suitable solvents include methylene chloride, methyl alcohol, methyl ethyl ketone, methyl isobutyl ketone, ethyl acetate, butyl acetate, cyclohexanone, butyl alcohol, dimethylformamide and the like as well as mixtures thereof. The dispersing medium can also contain transparent addenda, for example, plasticizers such as tricresyl phosphate, dibutyl phthalate or dioctyl phthalate; lubricants such as carbonic acid mixed esters such as ethyl cetyl phosphate, stripping acids, and the like.

In preferred embodiments of the invention, a dispersing or wetting agent is added to facilitate dispersion of the magnetic particles. Useful dispersing agents include a fatty acid amine, and commercially available wetting agents or surfactants such as Emcol CC59 which is quaternary amine available from Witco Chemical Corp., Gafac PE 510, Gafac RE 610, Gafac RE 960, and Gafac LO 529 which are phosphoric acid esters available from GAF Corp. The dispersion can be formed by diluting a concentrate of the magnetic particles and optionally a wetting agent dispersed in dibutyl phthalate with a solvent solution including the binder. Details of a preferred dispersion preparation and dilution procedure are set forth in U.S. patent application Ser. No. 473,500, filed Feb. 1, 1990, the disclosure of which is hereby incorporated by reference in its entirety.

The element of the invention includes a support film for color or black and white negative or reversal film applications which preferably is substantially transparent. Any of the support materials listed above or disclosed in Paragraph XVII of *Research Disclosure* 308119 Issue Number 30, December 1989. The support film can be cast according to methods known in the art from a dope including one or more of the above-described support materials and a solvent such as methylene chloride or any other solvent selected from those described above or mixtures thereof. The support film dope can include any of the conventional addenda known in the art to be useful therein including the transparent plasticizers discussed above, stripping acids, and so forth.

In an alternative embodiment to that disclosed in copending application Ser. No. 473,494, mentioned above, the magnetic particles dispersed in a suitable binder may be applied to a suitable support by any of the conventional coating techniques known in the art to achieve the required coverage and thus the necessary concentration in the magnetic layer to thereby provide a recordable layer while at the same time being transparent in a photographic sense.

Photographic elements in accordance with this invention comprise at least one photosensitive layer. Such photosensitive layers can be image-forming layers containing photographic silver halides such as silver chloride, silver bromide, silver bromoiodide, silver chlorobromide and the like. Any of the known silver halide emulsion layers, such as those described in Research Disclosure, Vol. 176, December 1978 Item 17643 and Research Disclosure Vol. 225, January 1983 Item 22534, the disclosures of which are incorporated by reference in their entirety, are useful in preparing photographic elements in accordance with this invention. Generally, the photographic element is prepared by coating the support film on the side opposite the magnetic recording layer with one or more layers comprising a dispersion of silver halide crystals in an aqueous solution of gelatin and optionally one or more subbing layers, such as, for example, gelatin, etc. The coating process can be carried out on a continuously operating machine wherein a single layer or a plurality of layers are applied to the support. For multicolor elements, layers can be coated simultaneously on the composite support film as described in U.S. Pat. No. 2,761,791 and U.S. Pat. No. 3,508,947. Addition useful coating and drying procedures are described in Research Disclosure, Vol. 176, December 1978, Item 17643. Suitable photosensitive image forming layers are those which provide color or black and white images.

As is taught in U.S. Pat. No. 3,782,947 noted above, whether an element is useful for both photographic and magnetic recording depends on both the size distribution and concentration of the magnetic particles and on the relationship between the granularities of the magnetic and photographic coatings. Generally, of course, the coarser the grain of the emulsion in the photographic element that contains the magnetic recording layer, the larger the mean size of the magnetic particles which can be tolerated. A magnetic particle concentration between about 1 and 10 mg/1000 $cm^2$ when uniformly distributed across the desired area of the photographic element will be sufficiently photographically transparent. Particle concentrations less than about 1 mg/1000 $cm^2$ tend to be insufficient for magnetic recording purposes and particle concentrations greater than about 10 mg/1000 $cm^2$ tend to be too dense for photographic purposes. Particularly useful particle concentrations are in the range of 2–8 mg/1000 $cm^2$. Concentrations of from about 4.5 mg/1000 $cm^2$ to about 5.5 mg/1000 $cm^2$ have been found to be particularly useful in reversal films.

The photographic elements according to this invention can contain one or more conducting layers such as antistatic layers and/or anti-halation layers such as described in Research Disclosure, Vol. 176, December 1978, Item 17643 to prevent undesirable static discharges during manufacture, exposure and processing of the photographic element. Antistatic layers conventionally used in color films have been found to be satisfactory for use herewith.

The invention will be further illustrated by the following examples:

EXAMPLE 1

Preparation of Coated Magnetic Particles 1 kg of Co-$\gamma$-$Fe_2O_3$ particle of surface area 45 $m^2$/g and coercivity 650 Hc available from Toda Kogyo under the trade designation CND 865V2 were milled in 2 liters of 0.5M $H_2SO_4$ using 2 mm glass beads. After milling the slurry was washed with water to pH 4.5 and concentrated to 28% by weight solids. The coercivity of the product powder was 465 Oe due to loss of cobalt from the surface. The specific area was 44.2 $m^2$/g and the saturation magnetization was 72.4 emu/g.

A dense silica skin was precipitated onto the particle of this dispersion by the simultaneous addition of a sodium silicate solution (solution A) and sulfuric acid (solution B) as follows:

| Solution A | 198.04 g | sodium silicate (40% by weight as $SiO_2$) |
|---|---|---|
| | 76.56 g | sodium sulfate |
| | 6980 ml | water |
| Solution B | 29.6 g | sulfuric acid |
| | 98.6 g | sodium sulfate |
| | 6980 ml | water |

790.7 g of slurry (at 28% oxide) was diluted to 11.03 liters with water to form a 2% dispersion in a 25 liter reactor.

The slurry was heated to 90° C. Solutions A and B were preheated to 65° C. and pumped simultaneously into the reactor at a rate of 200 ml/min. The pH was maintained between 9 and 10. After addition was completed, the temperature was maintained at 94° C. for 30 minutes and allowed to cool for a further 30 minutes to 35° C. The pH was adjusted to pH 7.0 and slurry stood overnight, after which the particles were recovered. Particle coercivity was 514 Oe, saturation magnetization 63.8 emu/g and the percent silica was 11.9% (Powder A).

EXAMPLE 2

A high surface area, (41 m$^2$/g) high powder coercivity (H$_c$ 850 Oe) Co-surface treated-$\gamma$-iron oxide powder supplied by Toda Kogyo under the trade designation CSF 4085V2 was dispersed in an aqueous solution medium for 3 hours using a small media mill. The formulation was as follows:

| | |
|---|---|
| Co-$\gamma$-Fe$_2$O$_3$ | 600.0 g |
| Water | 721.3 |
| Dispersant (Dequest 2006 40% active solution sold by Monsanto | 12.0 |
| | 1333.3 g |

Dequest 2006 is pentasodium amino tris(methylenephosphate)

The surface charge of these particles at pH 9.9 was determined by electroacoustic methods to be negative.

This dispersion was then treated with an alumina sol sold by Nalco Chemical Co. under the trade designation Nalco 1SJ-614 (particle size about 2 nm) to reverse the particle charge to positive and to promote adhesion of colloidal silica sol particles (about 20 nm diam) in the following manner.

1084 g of the above aqueous dispersion at 44% solids and 150 g of H$_2$O were milled for 30 minutes in a small media mill. Over a period of 30 minutes 123.2 ml of a fine alumina sol, PH5 containing 12.3 g Al$_2$O$_3$ were added to the mill.

At this stage the composition of the slurry was:

| | |
|---|---|
| Co-$\gamma$-Fe$_2$O$_3$ | 476.9 g |
| Al$_2$O$_3$ | 12.3 |
| Water | 981.7 |
| Dequest 2006 solution | 9.8 |

Reaction was allowed to continue for another 60 minutes. 300 g of distilled water and 592 g of colloidal silica sol at 30% by weight silica containing 147.8 g SiO$_2$ were added to the Al$_2$O$_3$-Co-surface treated-$\gamma$-Fe$_2$O$_3$ during continued milling over a period of 30 minutes. Milling was continued for 30 minutes. A further 600 g of water were added over a 30 minute period while milling was continued. The dispersion was recovered from the mill. (Powder B)

Measurements of the saturation magnetization of the starting powder (72.5 EMU/g) and the composite coated product Powder B (51.0 EMU/g) indicated that the shell was 29.7% of the total mass of the particles. The dried powder had a specific surface area of 85.1 m$^2$/g by BET analysis of N$_2$ adsorption isotherms.

EXAMPLE 3

Thicker coatings of SiO$_2$ can be achieved by adsorption of a dense silica layer of the particulate SiO$_2$ particles described in Example 2.

The following three compositions were prepared separately:

| | |
|---|---|
| 1. 2% By Weight Solid Particle slurry | |
| Final Slurry from Example 2 with 26% solids, 18.6% Co-$\gamma$-Fe$_2$O$_3$ | 1097 g |
| Water | 13153 |
| Sodium sulfate Na$_2$SO$_4$ | 202.4 g |
| | 14452.4 g |
| 2. Solution C | |
| Sodium silicate 40% SiO$_2$ | 51 g |
| Sodium sulphate Na$_2$SO$_4$ | 39.4 |
| Water | 3596 |
| | 3686.4 g |
| 3. Solution D | |
| Sulfuric acid H$_2$SO$_4$ | 7.62 g |
| Sodium sulfate Na$_2$SO$_4$ | 50.83 |
| Water | 3596 |
| | 3653.45 g |

The particle slurry was heated with stirring in a reactor to 90° C. The pH was adjusted from pH6 to pH 9.4 with 50% sodium hydroxide solution.

Solutions C and D were added simultaneously at a rate of 17 ml/min. over 3.5 hours. The slurry ph was periodically checked and small adjustments were made to maintain pH between 9 and 10. After addition was completed the reactor was held at 90° C. for a further 15 minutes.

The slurry was cooled to 25° C. and then the pH was adjusted to pH 7 with 0.5M H$_2$SO$_4$. The coated oxide was washed until the conductivity was less than 40 micro mho cm$^{-1}$. Finally the aqueous solution was separated from the particles and the sample was air dried (Powder C). The saturation magnetization of this sample, Powder C, was found to be 42.2 EMU/g and the shell was 41.8% of the mass of the particles. The specific surface area was 88.9 m$^2$/g by BET analysis of N$_2$ adsorption.

EXAMPLES 4 (CONTROL), 5 AND 6

A coating dispersion was prepared in accordance with the following recipe. The control, Example 4 used cobalt surface treated gamma iron oxide (Co-$\gamma$-Fe$_2$O$_3$) having a specific surface area of 41 m$^2$/g. Examples 5 and 6 employed Powder B (Examples 2) and Powder C (Example 3), respectively.

| | |
|---|---|
| Magnetic Particles | 385.0 g |
| Emcol CC59 | 13.5 |
| a wetting agent available from Witco Chemical Organics Div. UCARMAG 528 | 5.0 |
| a vinylic polymer binder available from Union Carbide Corp. CA139 (Morthane polyurethane binder) available from Morton Thiokol, Inc. | 83.3 |
| Butylmyristate | 3.9 |
| Myristic acid | 3.9 |
| Tetrahydrofuran | 355.6 |
| Cyclohexanone | 625.3 |
| Each of the three concentrates was diluted as follows: | |
| Concentrate | 10 g |
| Binder CA139 | 100 |
| Tetrahydrofuran | 283 |
| Cyclohexanone | 607 |
| | 1000 g |

The three resulting diluted dispersions were each coated thinly on a transparent Mylar substrate to give a dry down thickness of 1 to 3 μm and provide a magnetic pigment laydown of 1 to 10 mg/1000 sq cm.

Figure 2:
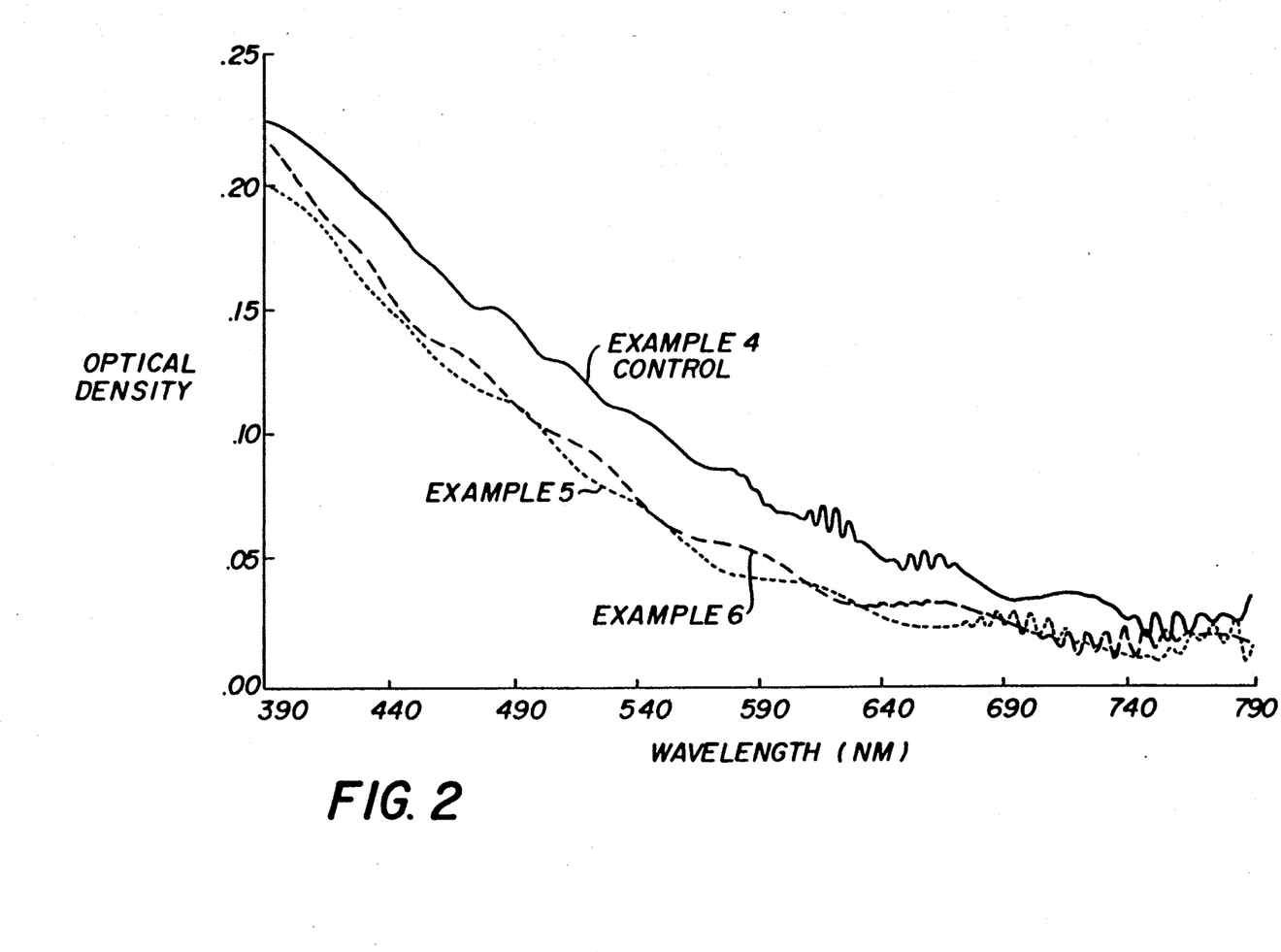
FIG. 2 is a graph which plots optical density against wavelengths illustrating the improved transparency of two compositions in accordance with this invention in comparison to a control sample.

Comparison of the optical density of coated powder particles B Example 5) and C (Example 6) with uncoated Co-$\gamma$-Fe$_2$O$_3$ (Example Control 4) is shown in FIG. 2 as a function of wavelength at laydown levels of 7.2 mg/ft$^2$, 7.2 mg/ft$^2$ and 7.8 mg/ft$^2$ all as Fe$_2$O$_3$, respectively.

For wavelengths longer than 400 nm the films with Powders B and C exhibit lower optical densities than that of the control.

Figure 3:
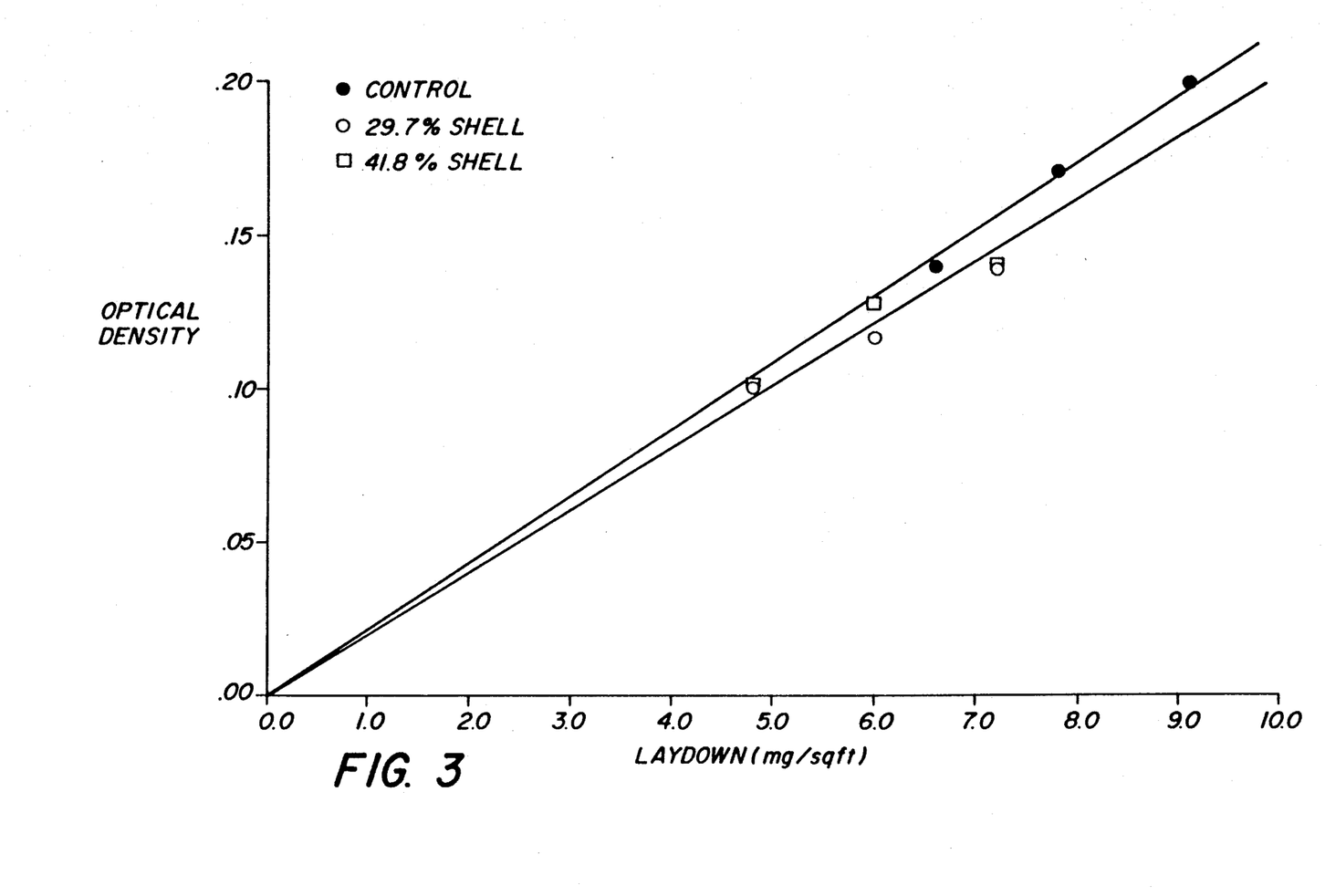
FIG. 3 is a graph plotting optical density against laydown for the same three samples as shown in FIG. 2 at a wavelength of 450 nanometers.
Figure 4:
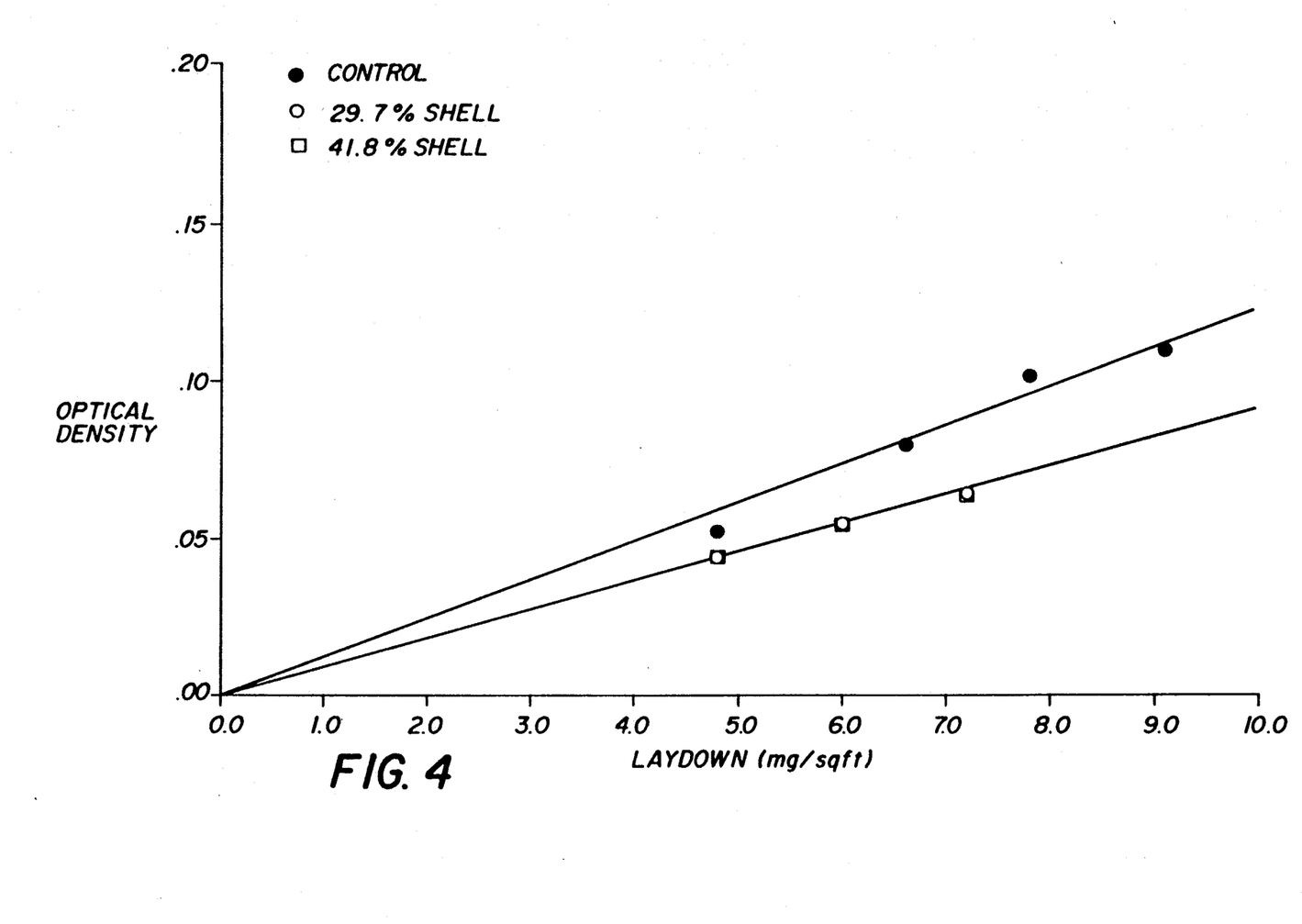
FIG. 4 is a graph similar to FIG. 3 with the exception that the wavelength is 550 nanometers.

Comparisons of optical densities of Examples 4 (Control), 5 and 6 at two wavelengths 450 nm and 550 nm are shown in FIGS. 3 and 4, respectively, as a function of laydown magnetic component concentration in mg/ft$^2$ as Fe$_2$O$_3$ ($\times 1.0764 =$ mg/1000 cm$^2$).

At 450 nm, the SiO$_2$ coated Co-$\gamma$-Fe$_2$O$_3$ show increasing advantages over Example 4 as laydown increases. At 550 nm the advantages of Examples 5 and 6 are more significant. A consequence of the fine dispersion and lower optical density is the reduction in the granularity of these transparent layers.

EXAMPLE 7 (Control) 8, and 9

These three examples utilize the same magnetic particles as Examples 4 (Control), 5 (Powder B) and 6 (Powder C), respectively.

A concentrate was prepared for each of the three magnetic materials by milling the following composition in a 250 cc small media mill using steel milling media for 6 hours.

| | |
|---|---|
| Magnetic Particles | 500 g |
| Wetting agent GAFAC PE510 available from GAF | 25 g |
| Solvent: Dibutylphthalate | 975 g |
| | 1500 g |

Dispersions prepared above, are diluted with a cellulose triacetate solution in methylene dichloride and methyl alcohol in a high shear mixer to yield the following casting composition:

| | Weight Percent |
|---|---|
| Methylene chloride | 83 |
| Methanol | 6.175 |
| Butanol | 2.8 |
| Cellulose triacetate (binder) | 6.5 |
| Dibutyl phthalate (non-volatile solvent) | 1% |
| GAFAC PE510 (wetting agent) | 0.025 |
| Magnetic Particle | 0.5 |
| | 100.000% |

This dispersion is coated on a cellulose acetate base such that the pigment laydown expressed as mg Fe$_2$O$_3$/1000 cm$^2$ to form thin (about 1 μm) layers of cellulose acetate containing uniformly dispersed magnetic particles. At these levels of pigment coded information can be written and read from the magnetic layers by use of suitable write/playback heads.

In addition to the magnetic pigments various dyes including magenta and blue may also be formulated in the pigmented layer to give neutral density films for the purpose of making reversal (color slide) films.

Another function of the magenta pigment and the dyes is the reduction of light piping from the exposed ends, sides or perforations in the film.

Figure 5:
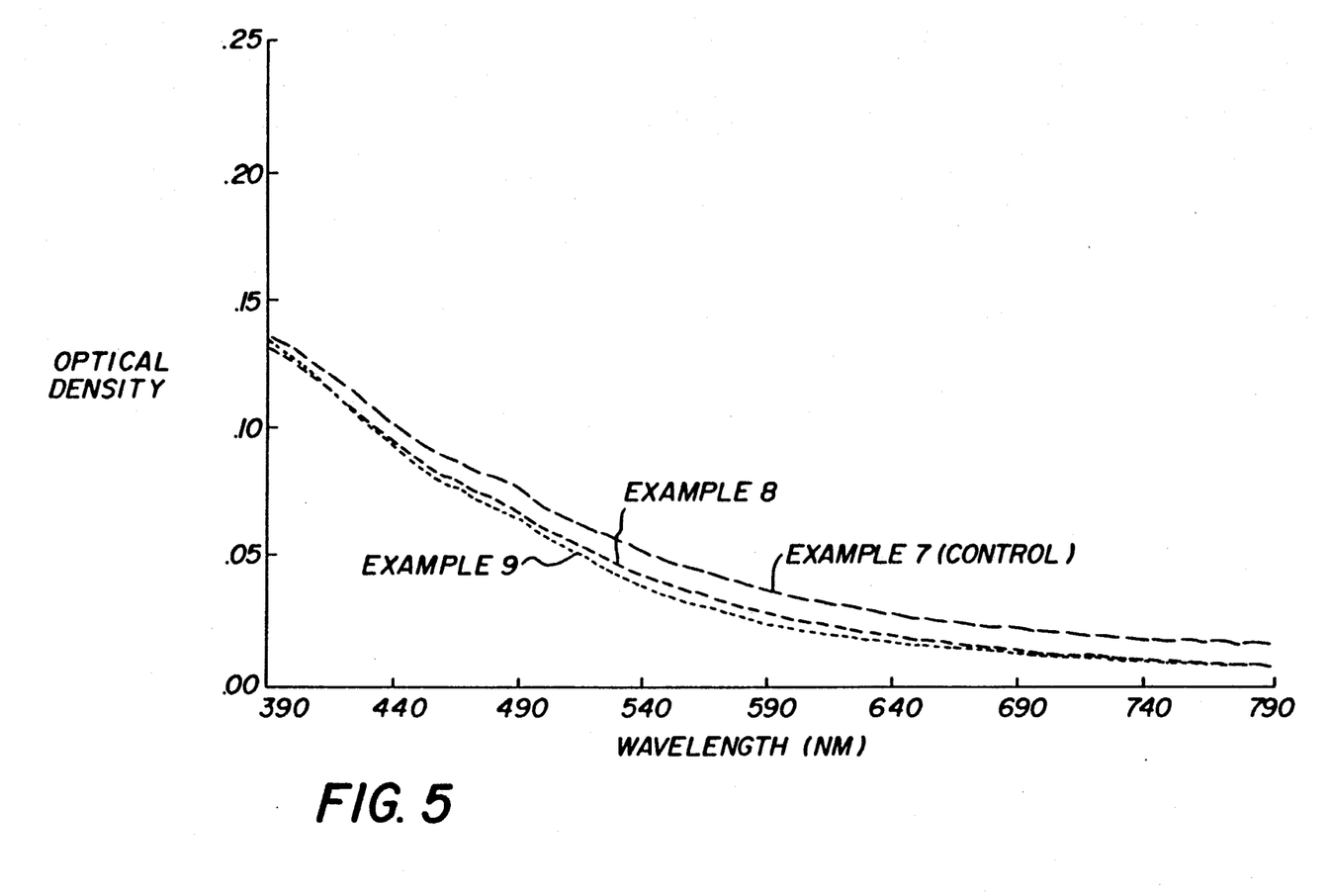
FIG. 5 is a graph similar to FIG. 2 plotting optical density against wavelength for two different compositions in accordance with this invention in comparison to a control sample.

A comparison of optical density of each of the three layers is shown in FIG. 5 wherein optical density is plotted against wavelength for each of Examples 7 (Control), 8 and 9 coated at laydown levels of 4.1 mg/ft$^2$, 4.4 mg/ft$^2$ and 4.3 mg/ft$^2$ all as Fe$_2$O$_3$, respectively. Further, in a similar fashion to that shown in FIGS. 2 and 4, as the lay down increases the decrease in optical density of the particles in accordance with this invention becomes greater.

It is to be understood that other materials can be employed in the examples for the shell materials of the magnetic particles, the binder materials and the substrates so long as the necessary limitations set forth above are met.

What is claimed is:

1. A transparent magnetic film comprising magnetic particles in a transparent binder, said magnetic particles being cobalt surface treated gamma Fe$_2$O$_3$ having a specific surface area of at least 30 m$^2$/g and exhibiting powder coercivities greater than 450 Oe, said magnetic particles being coated with from about 10 to about 50 percent by weight of a material having a refractive index less than that of said binder, the concentration of the coated magnetic particles in the film being from about 1 to about 10 mg/1000 cm$^2$.

2. A transparent magnetic film of claim 1 wherein the magnetic particles are present in a concentration of from about 2 to about 8 mg/1000 cm$^2$.

3. The transparent magnetic film of claim 1 wherein the specific surface area of the magnetic cobalt treated gamma Fe$_2$O$_3$ is at least 40 m$^2$/gm.

4. The transparent magnetic film of claim 1 wherein the powder coercivity of the magnetic particles is from about 650 Oe to about 850 Oe.

5. The transparent magnetic film of claim 1 wherein the coating on the magnetic particles makes up 20 to 45 percent by weight of the coated particles.

6. The transparent magnetic film of claim 1 wherein the coating on the magnetic particles is a material selected from the group consisting of silica, magnesium fluoride, calcium fluoride, and fluorinated hydrocarbon resins.

7. The transparent magnetic film of claim 6 wherein the coating material is SiO$_2$.

8. The transparent magnetic film of claim 6 wherein the coating material is fluorinated hydrocarbon resin.

9. The transparent magnetic film of claim 8 wherein the coating is polytetrafluoroethylene.

10. The transparent magnetic film of claim 1 wherein the coating on the magnetic particles contains voids.

11. The transparent magnetic film of claim 1 wherein the magnetic particles are present in a concentration of about 4.5 to about 5.5 mg/1000 cm$^2$.

12. The transparent magnetic film of claim 1 wherein the refractive indices of the coating and the binder are less than the refractive index of the magnetic particles.

13. A photographic element having a light-sensitive layer and a transparent magnetic layer, the transparent magnetic layer comprising magnetic particles in a transparent binder, said magnetic particles being cobalt surface treated gamma Fe$_2$O$_3$ having a specific surface area of at least 30 m$^2$/g and exhibiting powder coercivities of at least 550 Oe, said magnetic particles being coated with from about 10 to about 50 percent by weight of a material being a refractive index less than that of said binder, the concentration of the coated magnetic in the layer being from about 1 to about 10 mg/1000 cm$^2$.

14. The photographic element of claim 13 wherein the magnetic particles are present in a concentration of from about 4 to about 8 mg/1000 cm$^2$.

15. The photographic element of claim 13 wherein the magnetic particles are present in a concentration of from about 4.5 to about 5.5 mg/1000 cm$^2$.

16. The photographic element of claim 13 wherein the specific surface area of the magnetic cobalt treated gamma Fe$_2$O$_3$ is at least 40 m$^2$/gm.

17. The photographic element of claim 13 wherein the powder coercivity of the magnetic particles is from about 650 Oe to about 850 Oe.

18. The photographic element of claim 13 wherein the coating on the magnetic particles makes up 20 to 45 percent by weight of the coated particles.

19. The photographic element of claim 13 wherein the coating on the magnetic particles is a material selected from the group consisting of silica, magnesium fluoride, calcium fluoride, and fluorinated hydrocarbon resins.

20. The photographic element of claim 13 wherein the coating material is SiO$_2$.

21. The photographic element of claim 13 wherein the coating material is a fluorinated hydrocarbon resin.

22. The photographic element of claim 13 wherein the coating is polytetrafluoroethylene.

23. The photographic element of claim 13 wherein the light sensitive layer and the transparent magnetic layer are disposed on opposite side of a substrate.

24. The photographic element of claim 13 wherein the coating or the magnetic particles contains voids.

25. The photographic element of claim 13 wherein the refractive indices of the coating and the binder are less than the refractive index of the magnetic particles.

* * * * *